(12) United States Patent
Sprague

(10) Patent No.: US 9,162,205 B2
(45) Date of Patent: Oct. 20, 2015

(54) APPARATUSES FOR DISTRIBUTING FLUIDS IN FLUIDIZED BED REACTORS

(71) Applicant: UOP LLC, Des Plaines, IL (US)

(72) Inventor: Robert T. Sprague, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 371 days.

(21) Appl. No.: 13/731,431

(22) Filed: Dec. 31, 2012

(65) Prior Publication Data

US 2014/0186225 A1 Jul. 3, 2014

(51) Int. Cl.
 *B01J 8/08* (2006.01)
 *B01J 19/26* (2006.01)
 *F23C 10/00* (2006.01)
 *B01J 8/18* (2006.01)
 *B01J 8/28* (2006.01)

(52) U.S. Cl.
 CPC .............. *B01J 8/1872* (2013.01); *B01J 8/1827* (2013.01); *B01J 8/28* (2013.01); *B01J 2208/0092* (2013.01); *B01J 2208/00902* (2013.01); *B01J 2208/00911* (2013.01); *B01J 2208/00929* (2013.01); *B01J 2208/00938* (2013.01); *Y10T 137/8593* (2013.01)

(58) Field of Classification Search
 CPC ..... B01J 8/00; B01J 8/08–8/46; B01J 8/1872; B01J 19/00; B01J 19/26; B01J 15/00; B01J 15/02; B01J 15/08; B01J 53/00–53/18; F23C 10/00
 USPC .................................................. 422/143, 220
 See application file for complete search history.

(56) References Cited

U.S. PATENT DOCUMENTS

| 3,789,989 | A | 2/1974 | Carson |
| 4,378,292 | A | 3/1983 | Haase |
| 5,478,475 | A | 12/1995 | Morita et al. |
| 6,110,364 | A | 8/2000 | Hotier et al. |
| 6,126,905 | A | 10/2000 | Wells |
| 6,284,200 | B1 | 9/2001 | Hotier |
| 6,402,959 | B1 | 6/2002 | Dessapt et al. |

(Continued)

FOREIGN PATENT DOCUMENTS

| RU | 2133634 C1 | 7/1999 |
| RU | 2353417 C2 | 4/2009 |

(Continued)

OTHER PUBLICATIONS

PCT International Search Report for PCT/US2013/072752, mailed Mar. 6, 2014.

*Primary Examiner* — Walter D Griffin
*Assistant Examiner* — Huy-Tram Nguyen

(57) ABSTRACT

A fluid distribution apparatus is disposed in a fluidized bed reactor and includes a distributor pipe configured to carry a fluid and a centerpipe fluidly connected to the distributor pipe and enclosing an annular space for receiving the fluid from the distributor pipe. The annular space is defined by an interior radius including a cylindrical plug disposed concentrically within the centerpipe, an exterior radius including the centerpipe, an upper end including an upper circular plate, and a lower end including a lower circular plate. The fluid distribution apparatus further includes a plurality of inlet nozzles fluidly connected to the annular space and disposed through the centerpipe for distributing the fluid from the annular space to a bed of the fluidized bed reactor.

11 Claims, 5 Drawing Sheets

(56) References Cited

U.S. PATENT DOCUMENTS

| | | |
|---|---|---|
| 6,454,948 B2 | 9/2002 | Ferschneider et al. |
| 6,471,861 B1 * | 10/2002 | Burgard et al. ............... 210/232 |
| 6,797,175 B2 | 9/2004 | Hotier |
| 6,969,495 B1 | 11/2005 | Hotier et al. |
| 7,011,759 B1 | 3/2006 | Corradi |
| 7,288,200 B1 * | 10/2007 | Hotier et al. .................. 210/659 |
| 7,314,551 B2 | 1/2008 | Frey et al. |
| 7,473,368 B2 | 1/2009 | Hotier |
| 7,582,206 B2 | 9/2009 | Hotier et al. |
| 8,201,988 B2 | 6/2012 | Sun et al. |
| 2009/0321359 A1 | 12/2009 | Augier et al. |
| 2010/0101999 A1 | 4/2010 | Augier et al. |
| 2011/0303602 A1 | 12/2011 | Augier et al. |

FOREIGN PATENT DOCUMENTS

| | | |
|---|---|---|
| WO | 0185329 A2 | 11/2001 |
| WO | 2010002383 A1 | 1/2010 |

* cited by examiner

APPARATUSES FOR DISTRIBUTING FLUIDS IN FLUIDIZED BED REACTORS

TECHNICAL FIELD

The present disclosure generally relates to chemical reactor systems and apparatuses for use in chemical reactor systems. More particularly, the present disclosure relates to apparatuses for mixing and distributing fluids uniformly over the cross-section of beds in fluidized bed chemical reactor systems.

BACKGROUND

The chemical and petroleum process industries use many types of fluidized reactor systems in processing and/or purifying chemicals. Processing and/or purifying often involves mixing fluids and passing a mixture of the fluids over a reactor bed, such as an adsorption bed, or passing the fluids over trays in a distillation column. One particular type of a fluidized bed reactor system is a multi-bed reactor with co-current flow of a process fluid and a feed fluid. The multi-bed reactor includes a series of solid particulate beds of catalyst particles that catalyze a reaction involving a process fluid flowing over the beds. The efficiency and life of the bed are influenced by the distribution of fluid flowing over the bed. Redistribution and mixing of fluids flowing over the beds is important for maximizing the life of the bed and maximizing the utilization of the catalyst by preventing zones in the bed having below average fluid flow, referred to in the art as "dead zones."

One particular type of process employing a multi-bed reactor system is the adsorption separation process. The adsorption separation process has been developed through simulated moving bed (SMB) technology, where the adsorption separation process can be operated on a continuous basis. SMB reactor systems connect a feed stream to a series of beds in sequence: the feed stream is first connected to bed no. 1, then to bed no. 2, and so forth for numerous beds, the number of beds often being between 12 and 24. A rotary valve is usually employed to switch between the various beds. These beds may be considered to be portions of a single large bed whose movement is simulated. The moving bed simulation may be simply described as dividing the bed into series of fixed beds and moving the points of introducing and withdrawing liquid streams past the series of fixed beds instead of moving the beds past the introduction and withdrawal points. There are many different process requirements in moving bed simulation processes, resulting in different flow schemes. Common to each of these flow schemes, however, is the need for even distribution of the feed fluid over the numerous beds. In addition, the efficiency of the process has many factors, including the redistribution of fluid from one bed to the next, and the mixing and redistribution of a process fluid with one of the feed streams between two beds.

Improvements in the fluid distribution apparatus of such fluidized bed reactor systems can improve efficiency and increase the life of the catalysts disposed in the fluidized bed reactor system. Accordingly, it is desirable to provide a fluidized bed reactor system employing a fluid distribution apparatus that is capable of mixing and distributing a fluid uniformly over the cross-section of a bed. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The present disclosure provides embodiments of a fluid distribution apparatus. The fluid distribution apparatus may be disposed within a fluidized bed reactor. In one embodiment, an exemplary fluid distribution apparatus includes a distributor pipe configured to carry a fluid and a centerpipe fluidly connected to the distributor pipe and enclosing an annular space for receiving the fluid from the distributor pipe. The annular space is defined by an interior radius including a cylindrical plug disposed concentrically within the centerpipe, an exterior radius including the centerpipe, an upper end including an upper circular plate, and a lower end including a lower circular plate. The fluid distribution apparatus further includes a plurality of inlet nozzles fluidly connected to the annular space and disposed through the centerpipe for distributing the fluid from the annular space to a bed of the fluidized bed reactor.

In another embodiment, an exemplary fluid distribution apparatus includes a distributor pipe configured to carry a fluid and a centerpipe fluidly connected to the distributor pipe and enclosing a conical distributor including a conical shape for receiving the fluid from the distributor pipe. The conical distributor is defined by an exterior radius including the centerpipe, an upper end including an upper angled, circular plate, and a lower end including a lower circular plate. The fluid distribution apparatus further includes a plurality of inlet nozzles fluidly connected to the conical and disposed through the centerpipe for distributing the fluid from the conical distributor to a bed of the fluidized bed reactor.

In yet another embodiment, disclosed herein is a fluidized bed reactor that includes a distributor pipe configured to carry a fluid, a centerpipe fluidly connected to the distributor pipe and enclosing, within an interior portion of the centerpipe, a fluid distribution apparatus for receiving the fluid from the distributor pipe, a plurality of inlet nozzles fluidly connected to the fluid distribution apparatus, disposed through the centerpipe for distributing the fluid from the fluid distribution apparatus, and including a distributor box disposed at an end thereof opposite an end connected to the fluid distribution apparatus, and a reactor bed including a plurality of particles for chemically interacting with the fluid. The distributor box distributes the fluid over the bed including the plurality particles.

BRIEF DESCRIPTION OF THE DRAWINGS

The fluidized bed reactor and its associated fluid distribution apparatus will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. All of the embodiments and implementations of the fluid distribution apparatus and fluidized bed reactors described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

A wide variety of processes use co-current flow fluidized bed reactors, or reactors where there is a fluid that flows over a solid bed of particulate materials, to provide for contact between the fluid and a solid. In an adsorption separation system, the solid usually includes an adsorbent material which preferentially adsorbs one or more components in a fluid mixture. The adsorbed material is then removed from the adsorbent by passing a desorbent over the solid bed, and the desorbed component or components are collected. The fluid can be a liquid, vapor, or mixture of liquid and vapor.

The fluidized bed reactor typically includes one or more fluid distribution apparatus. The fluid distribution apparatuses are provided for distributing the fluid over the bed and typically include a "distributor box" connected to an inlet feed pipe, a solid splash plate at the bottom of the distributor box, and outlet holes on the sides of the box. A feed stream enters the distributor box through the inlet feed pipe and flows out through the holes on the sides of the distributor box and over the bed. The inlet feed pipe may be connected to a distributor "collar," the distributor collar being configured to deliver the fluid to a plurality of inlet feed pipes. The distributor collar, in turn, is connected to a single distributor pipe that supplies the fluid to the distributor collar.

Figure 1:
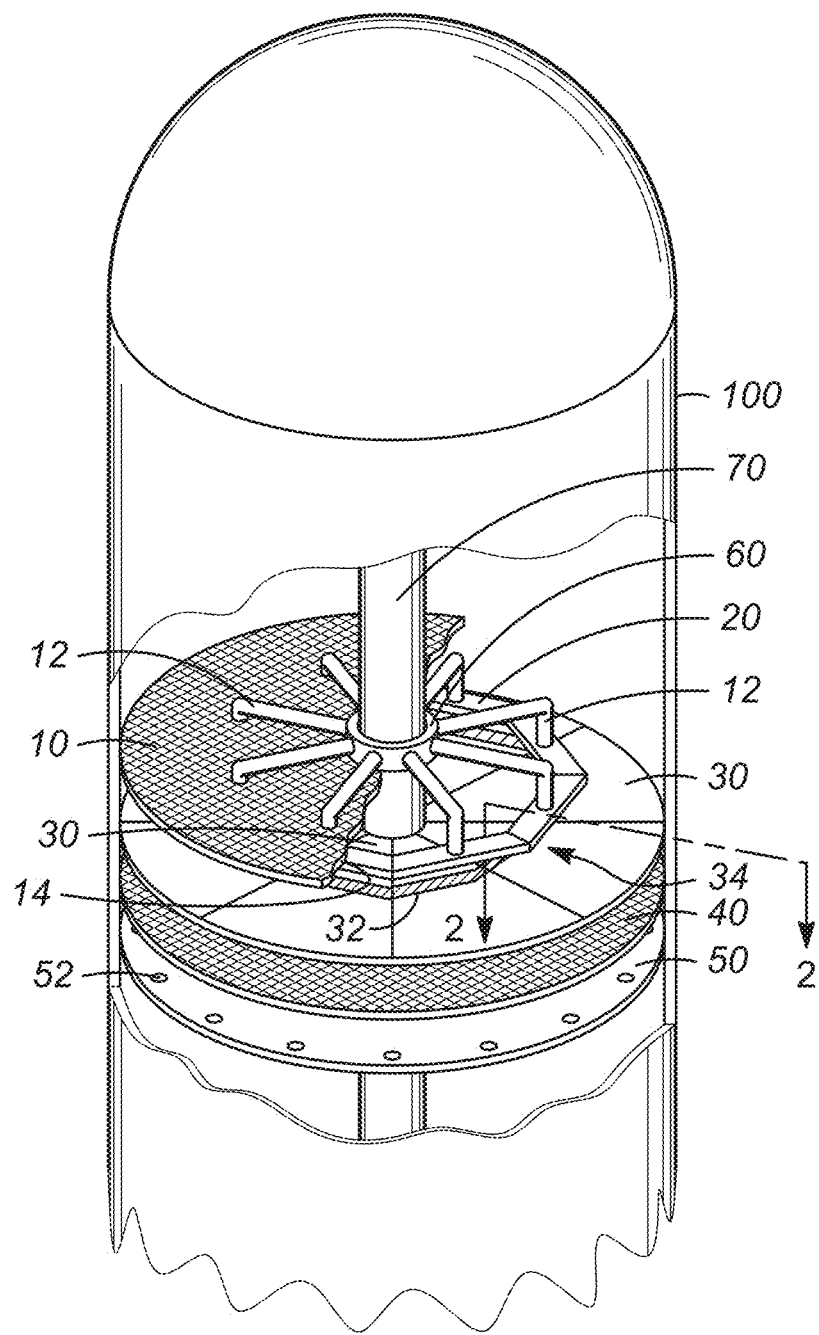
FIG. 1 is a schematic view of a known fluid distribution apparatus oriented about a central feed pipe within a cylindrical vessel reactor system.

A fluidized bed reactor conventionally employed in the art, as outlined above, is described in connection with FIG. 1. As shown in FIG. 1, a reactor vessel 100 includes an upper screen 10 having apertures distributed therein, a distributor box 20 having an inlet nozzle 12 and a plurality of fluid outlets 22 (shown in FIGS. 2 and 3), at least one baffle 30 disposed beneath a portion of the distributor box 20, and a lower screen 40 disposed beneath the at least one baffle 30 and having apertures distributed therein. The baffles 30 form a gap 32 for a mixture of the feed and process fluid to pass to the lower screen 40. The lower screen 40 includes a splash plate 42 (shown in FIG. 2) disposed beneath the gap 32 formed by the baffles 30. In FIG. 1, the distributor box 20 is disposed beneath the upper screen 10, such that there is a gap 14 between the upper screen 10 and the distributor box 20. This gap provides space for the process fluid from the bed above the distribution apparatus to flow around the distributor box 20. The distributor box 20 has a toroidal shape and a rectangular cross-section. The upper 10 and lower 40 screens have a generally circular configuration. The apparatus is disposed within the cylindrical vessel reactor 100 and is positioned between beds of solid particles.

The fluidized bed reactor can, optionally, further include a flow distributor plate 50 as best seen with reference to FIG. 1 positioned beneath the lower screen 40 and placed on top of the adsorbent bed. The flow distributor plate can further even the flow, and can contribute to restricting adsorbent movement at the top of the bed, where the flow distributor plate has apertures 52 sized sufficiently small to prevent to passage of adsorbent through the flow distributor plate.

The flow of the process fluid passes through the upper screen 10 and a first portion passes through the central part of the screen 10 that is located within the inner edge of the distributor box 20, and a second portion passes through the screen that is located between the outer edge of the distributor box 20 and the outer edge of the screen 10. The first portion and second portion are in substantially equal amounts to provide a balanced flow across the gaps 34 between the distributor box 20 and the baffles 30.

The apparatus includes a plurality of inlet nozzles 12 for a more even distribution of the feed stream. Each of the plurality of inlet nozzles 12 is connected to a ring-shaped distributor collar 60. The distributor collar 60 receives a fluid flow from a single distributor pipe (not shown). The distributor collar 60 distributes the fluid flow from the distributor pipe to each of the inlets 12. The distributor collar is disposed around a centerpipe 70 of the vessel 100. The centerpipe 70 is for mechanical support of the grids between each adsorbent bed. The interior of the centerpipe is evacuated and connected to an external venting system. There is for example, however, air or welding gases from fabrication within the enclosed centerpipe itself (the non-distributor portions not connected to the liquid distribution system) which if not vented would become pressurized when the vessel heats up during normal operation. The external venting ensures, the non-liquid filled interior portions of the centerpipe remain at ambient (or other controlled pressure).

Figure 2:
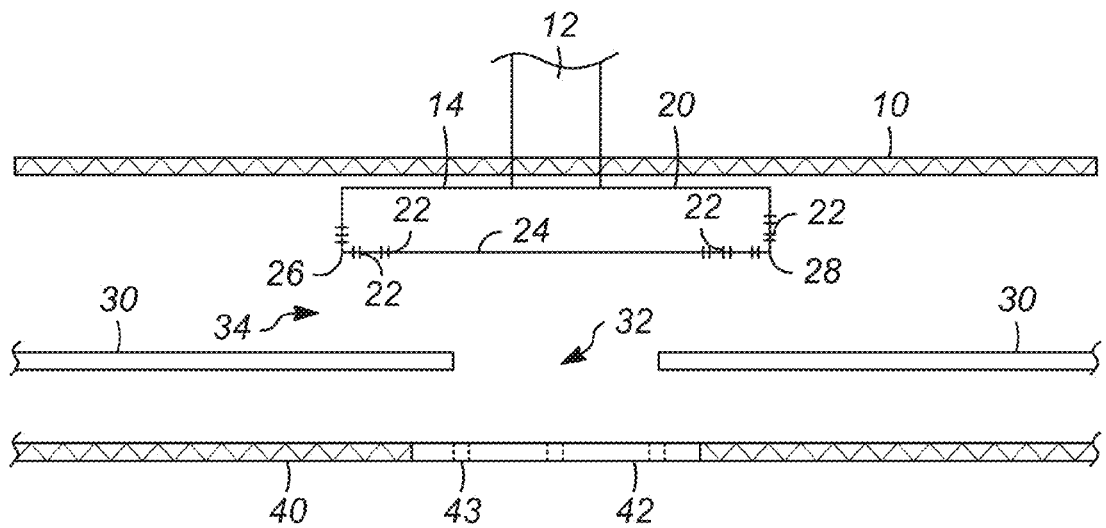
FIG. 2 is a side cross-sectional view of a portion of the fluid distribution apparatus of FIG. 1.

Two known distributor box 20 designs will now be described briefly with regard to FIGS. 2 and 3. In FIG. 2, the distributor box 20 has a bottom plane 24 and the fluid outlets 22 are holes distributed over the bottom plane 24 toward the edges 26, 28 of the plane 24. The baffles 30 are positioned beneath the fluid outlets 22 and the process fluid flows across the gap 34 between the baffles 30 and the distributor box 20. The baffles 30 overlap the fluid outlet ports 22 to provide good mixing. This is achieved with at least a 20 mm spacing from the outlet ports 22 to the edge of the baffles 30. The feed fluid mixes with the process fluid in a cross flow mixing environment, and the subsequent mixture passes through the baffle gap 32 to the lower screen 40. The baffle gap 32 can be sized sufficiently large to prevent fluid jetting onto the splash plate 42, and the width of the splash plate 42 is preferably greater than the width of the baffle gap 32.

Figure 3:
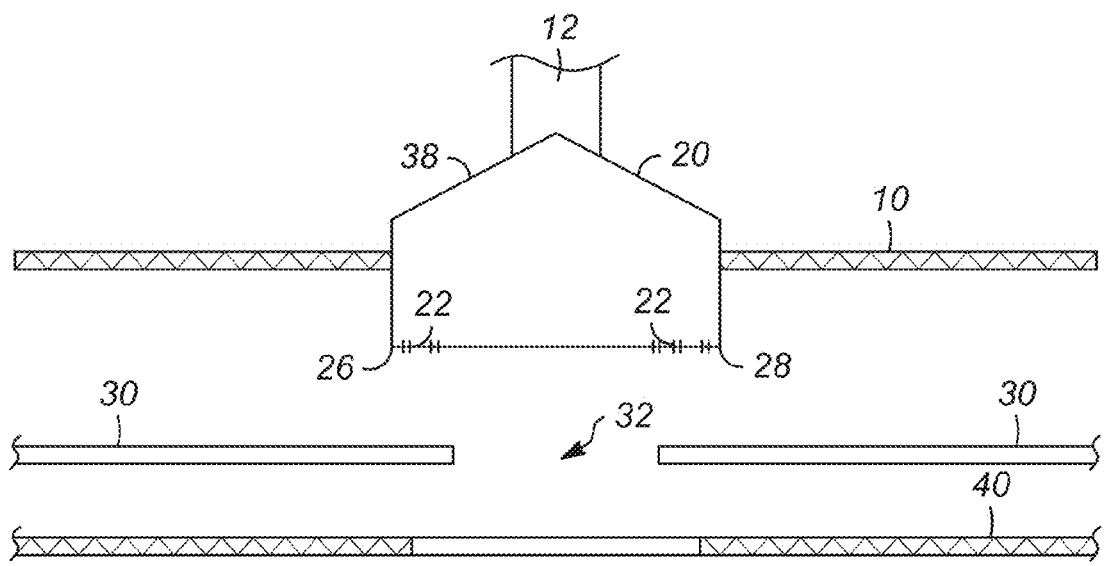
FIG. 3 is a side cross-sectional view of an alternative fluid distribution apparatus known in the art.

In FIG. 3, the distributor box 20 is disposed partially below the upper screen 10. The top 38 of the distributor box 20 can be flat, or shaped to facilitate flow of process fluid in the bed above the upper screen 10 toward the edges of the distributor box 20. In FIG. 3, the shape is presented as "peaked."

For reactor including the distributor box design of either FIG. 2 or FIG. 3, the reactor includes a plurality of substantially wedge shaped sections, where there are anywhere from 8 to 40 sections. Typically, there are between 20 and 30 sections and more typically between 24 and 28 sections. Thus, the distributor box is a collection of trapezoidally shaped boxes when viewed from above, such that when fitted together form a polygonal shaped figure that approximates a toroidal shape. The wedge shaped sections include side flanges for attaching sections together, and for providing structural rigidity to the apparatus. The side flanges can be solid, or include openings to allow cross-flow between sections during operation.

Figure 4:
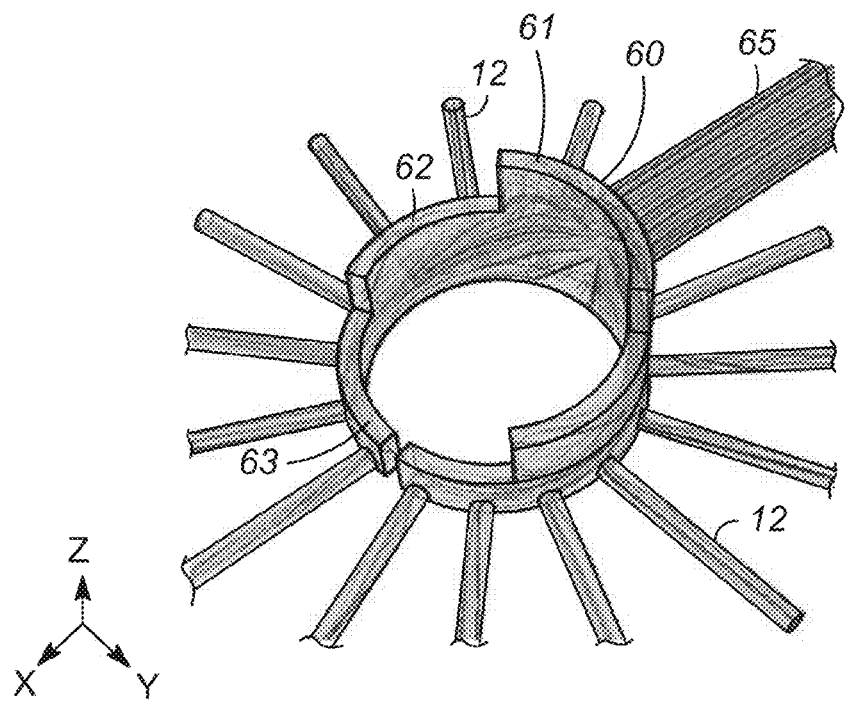
FIG. 4 is an enlarged, detailed view of a portion of the fluid distribution apparatus shown in FIG. 1.

Greater detail regarding the design of a previously known collar distributor 60 is presented with regard to FIG. 4. The previously known collar distributor 60 design includes a "stepped" configuration. The collar distributor 60 includes a first step 61 that is proximate to the connection point with a distributor pipe 65, which delivers the fluid to the collar distributor 60. Upon entering the collar distributor 60, the fluid is initially in step 61. The collar distributor 60 then reduces in height to step 62. Fluid flows from step 61 to step 62. Further, the collar distributor 60 then reduces in height to step 63. Fluid flows from step 62 to step 63. Each of steps 61, 62, and 63 includes one or more inlet nozzles 12 connected therewith. Fluid flows from each of the steps 61, 62, and 63 into each of the inlet nozzles 12.

In some vessel designs, a significant pressure drop within the chamber has been observed, limiting their operation. The possible cause of this pressure build up is that high fluid velocities within the chamber cause adsorbent movement and corresponding attrition, which leads to accumulation of fine particles that collect in the system. Local above-average velocities are typically observed on the top of the adsorbent bed, around the splash plate, and under the lower screen. Grids are designed to account for these high local velocities; however, it is assumed that there is equal flow to each of the typical 28 baffle sections.

Previous computational fluid dynamics (CFD) experimentation in some known designs has shown that some collar distributors have a maldistribution to the typical 14 nozzles (1 nozzle feeds 2 grid sections) up to 20% higher than the designed flow. These high flows will increase the surface velocity and promote movement of the adsorbent on the bed surface. The cause of flow maldistribution to the nozzles is the collar distributor's "stepped" configuration, as described above with regard to FIG. 4. The steps in the collar contribute to loss of flow due to recirculation or back-mixing near the steps. In addition, back-mixing causes a broader residence time distribution (RTD) and higher liquid dispersion which has been shown to reduce performance.

Figure 5:
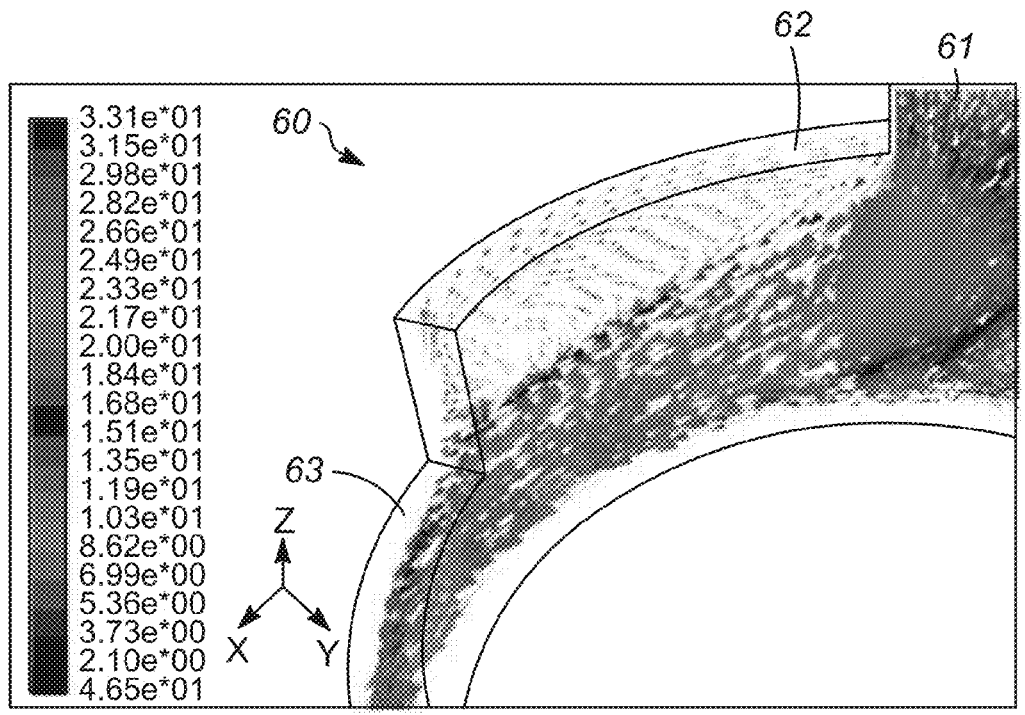
FIG. 5 is a computational fluid dynamics illustration of the flow within a fluid distribution apparatus as in FIG. 4.

The stepped collar distributor design was tested using theoretical modeling of the flows using computational fluid dynamics. A computational simulation of the process is shown in FIG. 5. Significant recirculation or back-mixing is shown to occur near the forward ends of each step. In particular, as shown in FIG. 5, the flow streams indicate a smooth, forward flow in the lower portion of step 62, but a recirculating flow in the forward, upper portion of step 62. The back-mixing at the top of the steps creates high tangential momentum in the collar such that some of the nozzles receive less flow than the design flow target. Further, this back-mixing causes a broader calculated RTD and higher liquid dispersion which reduces overall performance of the reactor.

One known solution to improve flow distribution and reduce pressure drop within the fluidized bed reactor is to increase the size of the collar distributor. A larger collar distributor, however, takes up volume within the reactor, leaving less space on the beds for catalyst or adsorbent particles and creates a disruption to idealized fluid flow within the reactor. As noted above, the centerpipe is a hollow, cylindrical space within the reactor. Embodiments of the present disclosure utilize some of the space within the centerpipe to accommodate improved distribution apparatus. As the distribution apparatus are located internally within the centerpipe, bed space is maximized and fluid flow within the reactor is optimized.

Figure 6:
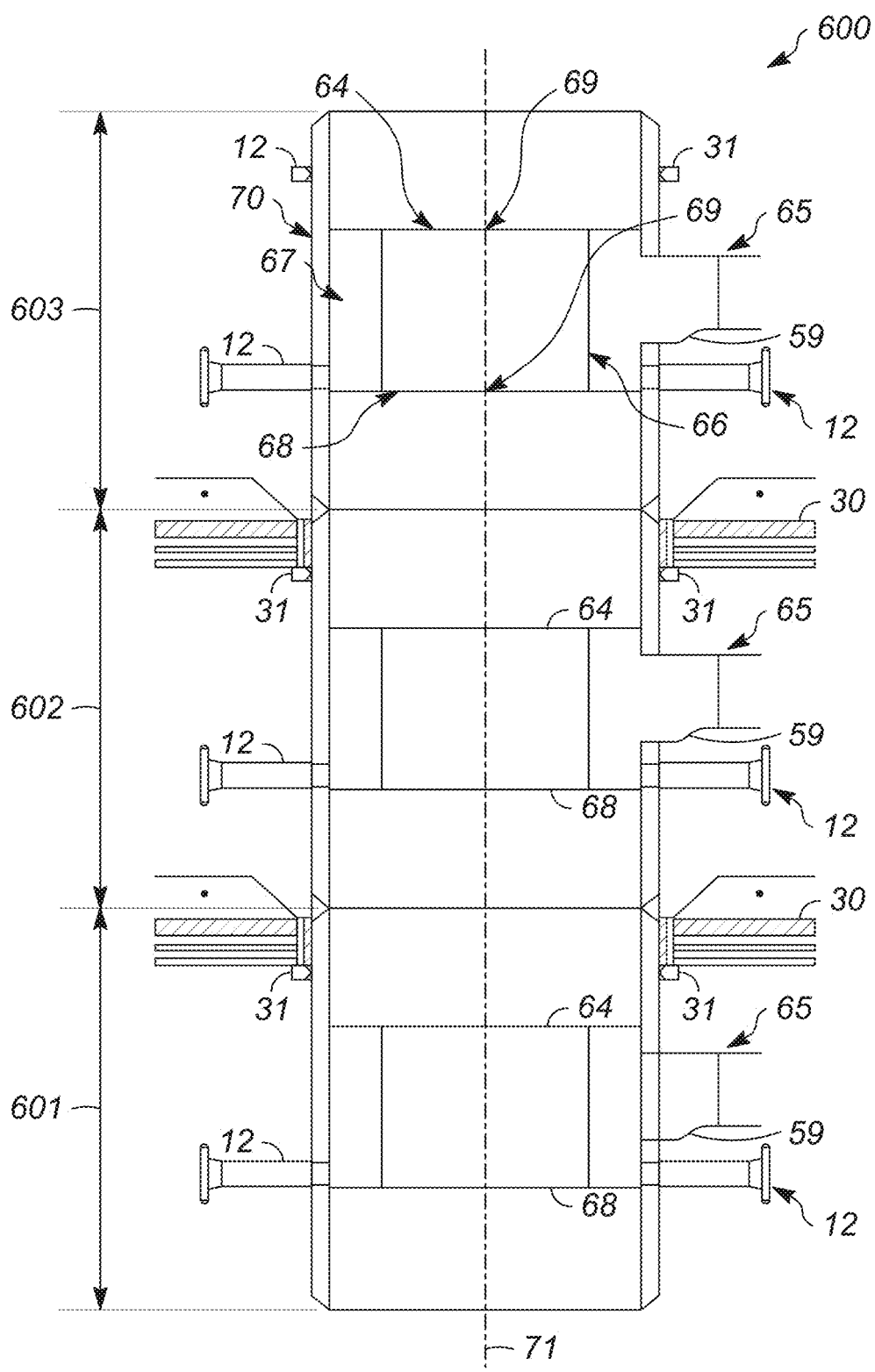
FIG. 6 is a cross-sectional view of a portion of a fluidized bed reactor system employing a fluid distribution apparatus in accordance with an exemplary embodiment of the present disclosure.

Embodiments of the present disclosure are thus directed to improved fluid distribution apparatus for use in fluidized bed reactors that are intended to replace external (with regard to the centerpipe) collar distributors, such as the one illustrated above in FIGS. 1 and 4, so that the fluidized bed reactor does not suffer the recirculation and back-mixing encountered in the prior art designs that include collar distributors and further does not impede fluid flow in the reactor or take up bed space. With reference now to FIG. 6, a cross-sectional view of a fluidized bed reactor 600, and in particular a simulated moving bed reactor, is shown including three bed sections 601, 602, and 603. While only three bed sections 601-603 are shown for ease of illustration, it will be appreciated that a fluidized bed reactor can include 12 to 24 or more beds. Each such bed section 601-603 is substantially identical, and so the description provided hereinafter is equally applicable to any of beds 601-603, unless otherwise noted.

The cross-section shown in FIG. 6 is taken through the center of centerpipe 70. The center axis of centerpipe 70 is shown by reference numeral 69. In contrast to the prior art designs, such as shown in FIG. 1, the feed fluid does not enter an annual collar distributor disposed externally about the centerpipe for subsequent distribution to the beds. Rather, in the exemplary embodiment shown in FIG. 6, feed fluid, provided via distributor pipe 65, enters into an annular space 67 within the center of centerpipe 70. The annular space is defined on its lower end by a circular lower plate 68, a circular upper plate 64, a cylindrical internal plug 66, and the interior wall of centerpipe 70. The internal plug 66 is disposed concentrically within centerpipe 70, and extends between lower plate 68 and upper plate 64. Each of the plates 64, 68, and the plug 66 are sealingly welded to one another, and within the centerpipe 70, so as to prevent unwanted fluid leakage out of the annular space 67.

Feed fluid flows into the annular space 67 via distributor pipe 65. Feed fluid exits annular space 67 via inlet nozzles 12, whereafter the feed fluid flows to the various distributor boxes 20, as described in greater detail above in FIGS. 1-3, for distribution thereof over the bed baffles 30. The inlet nozzles 12 extend from the annular space 67 through the centerpipe 70 to distribute fluid externally thereto. The baffles 30 (and associated grids and screens) are supported about the centerpipe 70 by support rings 31. The fluid then flows through the catalyst, and continues in the fluidized bed reactor as described in greater detail above. Further, vent holes (not shown) can be included through each section 601-603 to allow for venting of gaseous species.

In variations of the embodiment shown in FIG. 6, the upper and lower plates 64, 68 need not be oriented perpendicularly to the centerpipe center axis 69 as shown in FIG. 6. Rather, they can be angled upwardly or downwardly (with the apex at the axis 69). Further, they can be stepped, in a manner similar to the collar distributor 60 shown in FIG. 4. The angled or stepped designs of upper and lower plates 64, 68 can be provided to minimize volume within the annular space 67 or to optimize the flow distribution of the feed fluid within the annular space 67 according to a particular reactor design. Further, in variations of the embodiment shown in FIG. 6, the internal plug 66 need not be cylindrical or axi-symmetric with regard to axis 69. Rather, the plug 66 could have a different cross-section, such as triangular, rectangular, etc., or the plug 66 could be offset from center. These variations again would be provided to optimize the flow of the feed fluid for a particular reactor design. Such design modifications from the embodiment shown in FIG. 6 are expected to be within the level of skill of a person having ordinary skill in the art.

Figure 7:
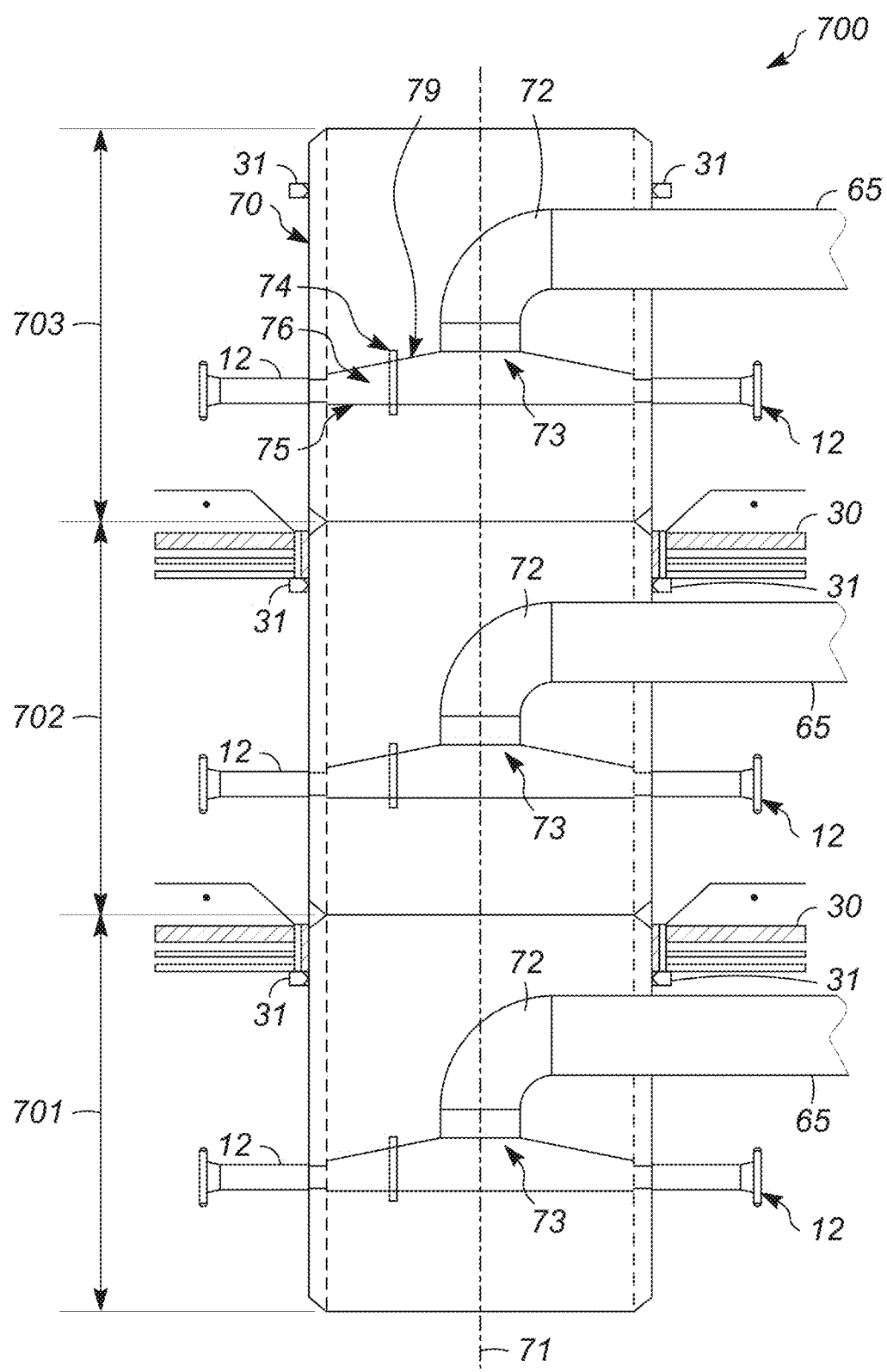
FIG. 7 is a cross-sectional view of a portion of a fluidized bed reactor system employing a fluid distribution apparatus in accordance with another exemplary embodiment of the present disclosure.

With reference now to FIG. 7, a cross-sectional view of a fluidized bed reactor 700 in accordance with another exemplary embodiment is shown including three bed sections 701, 702, and 703. As with bed reactor 600, while only three bed sections 701-703 are shown for ease of illustration, it will be appreciated that a fluidized bed reactor can include 12 to 24 or more beds. Each such bed section 701-703 is substantially identical, and so the description provided hereinafter is equally applicable to any of beds 701-703, unless otherwise noted.

The cross-section shown in FIG. 7 is taken through the center of centerpipe 70. The center axis of centerpipe 70 is shown by reference numeral 71. In contrast to the prior art designs, such as shown in FIG. 1, the feed fluid does not enter an annual collar distributor disposed externally about the centerpipe for subsequent distribution to the beds. Rather, in the exemplary embodiment shown in FIG. 6, feed fluid, provided via distributor pipe 65, enters into a conical distributor 73 located within centerpipe 70. The fluid enters into the conical distributor 73 at the top of the distributor 73, i.e., near the apex of the conical shape. As such, the distributor pipe 65 includes a curved section 72 within centerpipe 70 to re-orient the flow direction of the feed fluid 90 degrees downward. The conical distributor 73 is disposed axi-symmetrically within the centerpipe 70. The distributor 73 includes an upper surface 79 that is sloped downward from the apex. The distributor 73 further includes a lower surface 75 that is perpendicular to the center axis 71. The conical distributor 73 tapers at its outer radius to a height that is at least as great as the diameter of the inlet nozzles 12. One or more small vent pipes 74 is disposed through the distributor 73 and parallel to axis 71 to allow for venting to be maintained within the centerpipe 70, as the conical distributors 73 would otherwise block venting action within the centerpipe 70.

Feed fluid flows into the conical distributor 73 via distributor pipe 65. Feed fluid exits conical distributor 73 via inlet nozzles 12, whereafter the feed fluid flows to the various distributor boxes 20, as described in greater detail above in FIGS. 1-3, for distribution thereof over the bed baffles 30. The inlet nozzles 12 are attached to the conical distributor 73 at its outer radius, which as noted above has a height that is at least as great as the diameter of the inlet nozzles 12. The inlet nozzles 12 extend from the distributor 73 through the centerpipe 70 to distribute fluid externally thereto. The baffles 30 (and associated grids and screens) are supported about the centerpipe 70 by support rings 31. The fluid then flows through the catalyst, and continues in the fluidized bed reactor as described in greater detail above.

In a further aspect of the present disclosure, in order to further decrease the pressure drop within the exemplary distribution apparatus described above, in one embodiment, the distributor pipe 65 and/or the inlet nozzles 12 are modified from straight pipe configurations to pipes with reducers. An example of such reducers is shown in FIG. 6 by reference numeral 59. In particular, FIG. 6 shows that distributor pipe 65 includes a straight portion and a reducer portion (59). The reducer 59 is an eccentric increase in the diameter of the pipe proximate to the connection with the centerpipe 70. Likewise, in embodiments where the inlet nozzles 12 include reducers (not particularly illustrated in any figure) each inlet nozzle 12 would include a straight portion and a reducer portion. Here as well, the reducer is an eccentric increase in the diameter of the inlet nozzle proximate to the connection with the centerpipe 70. Reducers may be provided in a distribution apparatus design as in either FIG. 6 or FIG. 7 for either or both of the distributor pipe 65 and the inlet nozzles 12.

Accordingly, embodiments of improved fluid distribution apparatus for use in distributing a fluid within a fluidized bed reactor have been described. It will be appreciated that the described embodiments eliminate the need for the traditional collar distributor, which as shown in FIG. 5 contributes to uneven fluid distribution within inlet nozzles 12 and an uneven residence time distribution (RTD) of the fluid therein. The described embodiments allow for improved fluid flow distribution to the inlet nozzles, therefore reducing the fluid velocity over the adsorbent bed and preventing particle collisions and attrition. The design change further results in an improved RTD and a reduced liquid dispersion, which is expected to improve the reactor performance. It will further be appreciated that the described embodiments of the fluid distribution apparatus may change the design of the inlet nozzles and the distributor pipe from straight pipes to pipes with reducers proximate the centerpipe to further decrease the pressure drop, which is expected to minimize the pressure loads on the rotary valve.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of this disclosure.

What is claimed is:

1. A fluid distribution apparatus disposed in a fluidized bed reactor comprising:
   a distributor pipe configured to carry a fluid;
   a centerpipe fluidly connected to the distributor pipe and enclosing an annular space for receiving the fluid from the distributor pipe, wherein the annular space is defined by an interior radius comprising a cylindrical plug disposed concentrically within the centerpipe, an exterior radius comprising the centerpipe, an upper end comprising an upper circular plate, and a lower end comprising a lower circular plate; and
   a plurality of inlet nozzles fluidly connected to the annular space and disposed through the centerpipe for distributing the fluid from the annular space to a bed of the fluidized bed reactor.

2. The apparatus of claim 1, wherein each of the plurality of inlet nozzles comprises a reducer portion that is proximate to a connection point between the centerpipe and each such inlet nozzle.

3. The apparatus of claim 1, wherein the distributor pipe comprises a reducer portion that is proximate to a connection point between the centerpipe and the distributor pipe.

4. The apparatus of claim 3, wherein the reducer portion is an eccentric increase in the diameter of the distributor pipe.

5. The apparatus of claim 1, wherein the cylindrical plug is disposed axi-symmetrically within the centerpipe.

6. The apparatus of claim 1, wherein the upper circular plate is disposed perpendicularly to a center axis of the centerpipe.

7. The apparatus of claim 1, wherein the lower circular plate is disposed perpendicularly to a center axis of the centerpipe.

8. The apparatus of claim 1, wherein the fluidized bed reactor is a simulated moving bed reactor.

9. The apparatus of claim 1, wherein the bed comprises a plurality of adsorbent particles, and wherein a portion of the fluid distributed through the plurality of inlet nozzles is adsorbed onto the plurality of adsorbent particles.

10. The apparatus of claim 9, wherein each of the plurality of inlet nozzles comprises a distributor box disposed at an end thereof opposite an end connected to the annular space, and wherein the distributor box distributes the fluid over the bed comprising the plurality of adsorbent particles.

11. The apparatus of claim 1 comprising 12 inlet nozzles.

* * * * *